United States Patent
Heeringa

[11] Patent Number: 5,852,549
[45] Date of Patent: Dec. 22, 1998

[54] POWER-SUPPLY CIRCUIT

[75] Inventor: Schelte Heeringa, Drachten, Netherlands

[73] Assignee: U.S. Philips Corporation, NY, N.Y.

[21] Appl. No.: 757,527

[22] Filed: Nov. 27, 1996

[30] Foreign Application Priority Data

Nov. 27, 1995 [EP] European Pat. Off. ............ 95203249

[51] Int. Cl.$^6$ .............................. H02M 3/335; H02J 7/04
[52] U.S. Cl. .............................. 363/18; 363/19; 363/21; 320/130
[58] Field of Search ................. 363/18, 19, 56, 363/97, 21; 320/22, 35, 130, 39, 40; 323/285, 284

[56] References Cited

U.S. PATENT DOCUMENTS

| | | | |
|---|---|---|---|
| 4,378,585 | 3/1983 | Bete | 363/19 |
| 4,464,619 | 8/1984 | Schwarz et al. | 320/40 |
| 4,523,139 | 6/1985 | Schwarz et al. | 320/40 |
| 4,585,988 | 4/1986 | Nakai | 323/285 |
| 4,652,984 | 3/1987 | Van Der Akker et al. | 363/18 |
| 4,965,506 | 10/1990 | Algra et al. | 320/23 |
| 5,479,330 | 12/1995 | Bergk | 363/19 |

Primary Examiner—Robert E. Nappi
Assistant Examiner—Rajnikant B. Patel
Attorney, Agent, or Firm—Bernard Franzblau

[57] ABSTRACT

In a self-oscillating power-supply circuit for charging a battery, a switching transistor (T2) is turned off if the voltage across a sensing resistor (R3) exceeds the threshold voltage of a zener diode (D5). The zener diode is arranged in parallel with the series arrangement of the base-emitter junction of the switching transistor and the sensing resistor, so that the voltage of the battery does not influence the peak current at which the switching transistor is turned off. A diode (D6) is arranged in series with the zener diode and can be short-circuited by means of a switch (T3) in order to switch the power-supply circuit from slow charging to rapid charging. A voltage sensor (R8, R9, T4) monitors the battery voltage and eliminates the short-circuit of the diode (D6) when a given battery voltage is reached so that the power-supply circuit changes over to slow charging. A cascode transistor (T1) protects the switching transistor against overvoltage and stabilizes the voltage on the supply terminal (N3) to which a starting resistor (R6) is connected. This allows an accurate dosing of the current during slow charging.

33 Claims, 8 Drawing Sheets

POWER-SUPPLY CIRCUIT

BACKGROUND OF THE INVENTION

This invention relates to a power-supply circuit for powering a load from an input voltage, which circuit comprises: a transformer having a primary winding and a secondary winding, a switching transistor having a control electrode and having a first main electrode and a second main electrode which define a main current path of the switching transistor, which main current path is connected in series with the primary winding. A first resistor connected between the first main electrode and a first terminal of the secondary winding and a first diode is connected, in series with the load to be powered, between a second terminal of the secondary winding and the first terminal of the secondary winding. A series arrangement of a first capacitor and a second resistor is connected between the second terminal and the control electrode. A third resistor is connected between the control electrode and a supply terminal. A threshold element for limiting the voltage on the control electrode is connected between the control electrode and the first terminal.

Such a power-supply circuit is known from U.S. Pat. No. 4,464,619, particularly FIG. 3, and can be used for charging batteries and for powering electrical appliances. Such a power-supply circuit is particularly suitable for use in an electric shaver comprising rechargeable batteries, in which case the power-supply circuit supplies the charging current for the batteries and the supply current for the motor of the shaver. In the known power-supply circuit the switching transistor is a bipolar transistor. The third resistor supplies a starting current to the control electrode or base of the switching transistor, which is consequently turned on. This results in a current through the primary winding of the transformer. This primary current induces a voltage in the secondary winding, which is fed back in a positive sense to the base of the switching transistor by means of the series arrangement of the first capacitor and the second resistor. As a result of this, the switching transistor is rapidly saturated. During the forward interval the primary current increases linearly until the sum of the voltage drop across the first resistor and the voltage between the base and the first main electrode or emitter is equal to the threshold voltage of the threshold element. The threshold element is turned on and short-circuits the base of the switching transistor to a reference voltage, which causes the switching transistor to be cut off. In the flyback interval which then begins, the energy stored in the transformer is transferred, via the first diode, to the load to be powered, causing a secondary current to flow in the secondary winding, which current decreases gradually. At the transition from the forward interval to the flyback interval the sign (polarity) of the secondary voltage is reversed and again cut-off of the switching transistor is accelerated by positive feedback via the first capacitor and the second resistor. At the end of the flyback interval the first diode is turned off and a waiting interval begins, in which the voltage difference built up across the first capacitor is compensated via the third resistor until the drive voltage available on the base of the switching transistor is again sufficient to turn on this transistor. Thus, the power-supply circuit is self-oscillating.

In the known circuit arrangement the threshold element has been arranged in parallel with the series arrangement of the base-emitter junction of the switching transistor, the first resistor and the battery to be charged. This means that the battery voltage is one of the factors which determine the turn-off instant of the switching transistor. As a consequence, the nominal battery voltage is not fixed and it is not readily possible to arrange a larger or smaller number of batteries in series without the design of the power-supply circuit being adapted thereto, in order to preclude overcharging or undercharging of the batteries. By connecting the threshold element between the control electrode and the first terminal, the battery voltage no longer plays a part. The threshold element preferably comprises a zener diode.

U.S. Pat. No. 4,652,984 discloses a self-oscillating power-supply circuit in which the series arrangement of the first capacitor and the second resistor is connected to the control electrode of the switching transistor via an additional resistor instead of directly. The node between the series arrangement and the additional resistor is connected to the first main electrode of the switching transistor via a zener diode. However, the zener diode in this known power-supply circuit does not limit the voltage on the control electrode of the switching transistor, but it limits the drive current to the control electrode of the switching transistor by limiting the secondary voltage, which is fed back via the series arrangement of the first capacitor and the second resistor, when the input voltage increases. Consequently, the zener diode does not serve to turn off the switching transistor when the primary current reaches a given value. For this purpose a separate turn-off transistor is used, which is triggered by the voltage difference across a resistor through which the primary current flows.

U.S. Pat. No. 4,965,506 shows a zener diode and a resistor similar to those in the afore-mentioned U.S. Pat. No. 4,652,984, which have the same function and purpose. U.S. Pat. No. 4,965,506 further shows a series arrangement of a zener diode and a regular diode. One terminal of this series arrangement is connected to the first terminal of the secondary winding, but the other terminal of this series arrangement is connected not to the control electrode of the switching transistor but to the control electrode of a transistor, which in its turn drives a separate turn-off transistor.

The repetition frequency of the oscillation cycle depends, inter alia, on the time required to compensate for the voltage difference across the first capacitor. By arranging a threshold element, particularly a zener diode, across the series arrangement of the first resistor and the junction between the control electrode and the first main electrode, an additional conduction path is obtained in addition to the conduction path through the third resistance, via which additional conduction path the voltage difference across the first capacitor can be compensated. Indeed, in the flyback interval the sign of the secondary voltage is reversed and a current can flow through the zener diode, which then operates as a diode. This effect results in a substantial reduction of the time required to compensate for the voltage difference across the first capacitor. Consequently, the repetition frequency of the oscillation cycle increases, as a result of which the power-supply circuit supplies more energy per unit of time to the load or battery to be powered than previously. This can be taken into account in the design of the power-supply circuit. However, this limits the freedom of design.

SUMMARY OF THE INVENTION

It is an object of the invention to mitigate these drawbacks. To this end, the power supply circuit of the type defined in the opening paragraph is characterized in that a second diode is arranged in series with the threshold element, which second diode conducts during limitation of the voltage on the control electrode of the switching transistor.

The second diode blocks the additional conduction path of the threshold element. The presence of the second diode has the additional advantage that the power-supply circuit can be constructed so as to allow switching between a comparatively high repetition frequency and a comparatively low repetition frequency. To this end, an embodiment of the power-supply circuit is characterized in that a switch is connected in parallel with the second diode to short-circuit the second diode.

The switch can be a normal electrical switch or a transistor switch. Thus, for charging batteries the power-supply circuit can be changed over from slow charging (switch open; second diode not short-circuited) to rapid charging (switch closed; second diode short-circuited). To prevent the batteries from being overcharged, an embodiment is characterized in that the power-supply circuit further comprises means for opening and closing the switch in response to a signal which is a measure of a condition of the load to be powered. The condition can be the voltage or temperature of a battery to be charged.

In the case of a varying input voltage the secondary voltage also varies, which is fed back to the control electrode of the switching transistor. When the zener diode breaks down a varying current flows though this zener diode and produces a varying zener voltage across the internal resistance of the zener diode. As a result, the cut-off point of the switching transistor also varies. However, zener diodes having a low internal resistance are at the same time types having a higher zener voltage of more than 5 V. This is undesirable if the secondary voltage of the transformer is low and if the dissipation caused by the voltage drop across the second resistor is required to be low.

This problem can be remedied by means of an embodiment which is characterized in that the threshold element comprises: a further series resistor, connected between the series arrangement of the first capacitor and the second resistor and the control electrode of the switching transistor; a first zener diode, connected to the control electrode of the switching transistor; and a second zener diode, connected to the control electrode of the switching transistor via the further series resistor.

An alternative solution to this problem is provided by another embodiment which is characterized in that the threshold element comprises: a series arrangement of a zener diode and a further series resistor, and a bipolar transistor having its base connected to a node coupling the zener diode and the further series resistor, and having a main current path arranged in parallel with the series arrangement of the zener diode and the further series resistor.

In order to minimize the dissipation in the switching transistor the switching transistor should be switched rapidly. The switching can be accelerated by means of an embodiment which is characterized in that a second capacitor is arranged in parallel with the second resistor. In the case of transients the second capacitor reduces the impedance between the second terminal of the secondary winding and the control electrode of the switching transistor.

An embodiment in which the voltage across the load to be powered is monitored is characterized in that the second diode has a first electrode connected to the first terminal of the secondary winding and a second electrode to the threshold element, and the switch comprises: a first transistor having a first main electrode connected to the first terminal, a second main electrode coupled to the second electrode of the second diode, and a control electrode coupled to the second terminal of the secondary winding; a second transistor having a first main electrode connected to the first terminal, a second main electrode coupled to the control electrode of the first transistor, and a control electrode; and a voltage divider connected across the load to be powered and having a tap connected to the control electrode of the second transistor.

The first transistor, which may be bipolar or unipolar (MOS), short-circuits the second diode in the flyback interval. The power-supply circuit now operates as a rapid charger. The second transistor is turned on at a given battery voltage and short-circuits the control electrode of the first transistor, as a result of which the short-circuit of the second diode is eliminated and the power-supply circuit automatically changes over to slow charging.

The availability of the first and the second transistor makes it possible to avoid the use of a zener diode and the resulting variation in the cut-off point of the switching transistor. For this purpose, an embodiment is characterized in that the threshold element comprises: a first bipolar transistor having an emitter connected to the first terminal, a collector coupled to the control electrode of the switching transistor, and a base coupled to the second terminal of the secondary winding; a second bipolar transistor having an emitter connected to the first terminal, a collector coupled to the base of the first bipolar transistor, and a base connected to the first terminal via a diode; and the power-supply circuit further comprises: a voltage divider connected across the load to be powered and having a tap connected to the base of the second bipolar transistor.

The first and the second transistor are now bipolar transistors which in the forward interval, in combination with the diode that connects the base of the second bipolar transistor to the first terminal, form a threshold element having a threshold voltage which is the sum of the voltage across the diode and the collector-base voltages of the first and the second transistor. In the flyback interval the first and the second transistor operate as described hereinbefore.

The influence of varying input voltages can be reduced even further in an embodiment which is characterized in that the threshold element comprises: a first bipolar transistor having an emitter connected to the first terminal, a collector coupled to the control electrode of the switching transistor, and a base coupled to the second terminal of the secondary winding via a series resistor; a second bipolar transistor having an emitter connected to the first terminal, a collector coupled to the base of the first bipolar transistor via the series resistor, and a base, a third bipolar transistor of an opposite conductivity type having an emitter connected to the first terminal, a collector coupled to the base of the first bipolar transistor, and a base; and the power-supply circuit further comprises: a voltage divider connected across the load to be powered and having a tap connected to the base of the second bipolar transistor and to the base of the third bipolar transistor.

The previously mentioned diode has been replaced by a bipolar third transistor of an opposite conductivity type and a resistor has been added in series with the base of the first bipolar transistor. The series resistor enables the degree of compensation to be adjusted.

Particularly in the slow charging mode, the third resistor has a substantial influence on the repetition frequency of the oscillation cycle. The supply terminal to which the third resistor is connected is preferably characterized in that the supply voltage there at is stabilized with respect to variations in the input voltage. An alternative embodiment is therefore characterized in that the power-supply circuit further comprises: a further transistor having a first main electrode coupled to the second main electrode of the switching transistor and to the third resistor, a second main electrode coupled to the primary winding and a control electrode connected to receive a voltage which is stabilized with respect to variations in the input voltage.

The further transistor together with the switching transistor forms a cascode arrangement. When the cut-off point of the switching transistor is reached the voltage variation on the first main electrode of the further transistor is substantially larger than the voltage variation on the first main electrode of the switching transistor, so that the further transistor is turned off relatively rapidly in comparison with the switching transistor itself. The further transistor also limits the voltage across the switching transistor because a substantially constant voltage difference exists between the first main electrode and the control electrode of the further transistor. This reduces the dissipation in the switching transistor.

In combination with the afore-mentioned embodiments with change-over between slow charging and rapid charging, the further transistor provides an additional compensation for input voltage variations.

An embodiment with stabilization of the voltage on the control electrode of the further transistor is characterized in that the control electrode of the further transistor is connected to receive the input voltage via a resistor and is connected to a node between the load to be powered and the first diode via a further threshold element. By connecting the further threshold element, which can again be a zener diode, to the node of the load to be powered and the first diode, the further transistor remains cut off and the switching transistor cannot conduct either in the case of an interrupted battery or in the absence of the load.

Particularly if the further transistor is a bipolar transistor, the resistance via which the control electrode or base is connected to the input voltage may be too high to supply enough base current when the further transistor is turned on. Reducing the resistance leads to undesirable dissipation. In order to remedy this, an embodiment is characterized in that the power-supply circuit further comprises: a series arrangement of a diode and a resistor, which series arrangement is connected between the control electrode of the further transistor and the second terminal of the secondary winding. In the forward interval the second terminal supplies an additional drive signal to the control electrode of the further transistor via the diode and the resistor. In the flyback interval the voltage across the secondary winding is reversed. The diode is then cut off to prevent the voltage stabilization of the voltage on the control electrode from being disturbed.

The first main electrode of the further transistor carries a buffered stabilized voltage in the flyback interval when the switching transistor is not conductive. This is utilized in an embodiment which is characterized in that the power-supply circuit further comprises: a diode connected between the first main electrode of the first transistor and a further supply terminal, and a smoothing capacitor connected to the further-supply terminal. The diode is cut off in the forward interval when the switching transistor conducts. In the flyback interval the further transistor charges the smoothing capacitor via the diode. Since the further transistor forms an active buffer for the stabilized voltage on its control electrode, a comparatively small smoothing capacitor will be adequate. The voltage on the smoothing capacitor can be used for powering additional electronic circuits. In a shaver such circuits can be, for example, a control unit, a display and a microprocessor.

The change-over point from rapid charging to slow charging and vice versa can be influenced in various ways. To this end, an embodiment is characterized in that at least a part of the third resistor comprises a variable or adjustable resistor. As already stated, the third resistor has a substantial influence on the repetition frequency of the oscillation cycle, particularly in the slow-charging mode. By making the third resistor adjustable or variable it is possible to vary the supplied charging current.

An alternative embodiment is characterized in that the power-supply circuit comprises means for influencing the voltage on the tap of the voltage divider. As a result of this, the power-supply circuit will change over sooner or later than without said means.

BRIEF DESCRIPTION OF THE DRAWINGS

These and other aspects of the invention will be described and elucidated with reference to the accompanying drawings, in which.

In these Figures like parts bear the same reference symbols.

DESCRIPTION OF THE PREFERRED EMBODIMENTS

Figure 1:
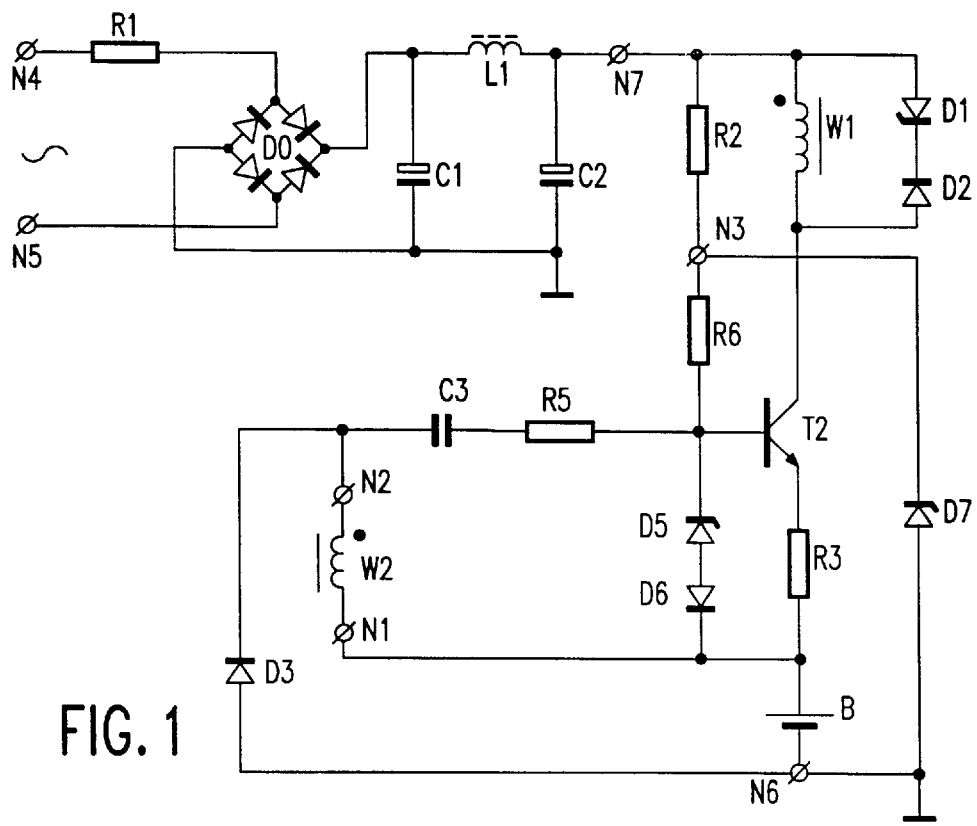
FIG. 1 shows an embodiment of a power-supply circuit in accordance with the invention.

FIG. 1 shows a circuit diagram of an embodiment of a power-supply circuit in accordance with the invention. The alternating mains voltage or a suitable direct voltage is applied to the input terminals N4 and N5. The alternating voltage is rectified by means of a diode bridge DO and is smoothed and filtered by means of capacitors C1 and C2 and a coil L1. The negative terminal of the rectified input voltage is connected to ground. The positive terminal N7 is connected to a primary winding W1 of a transformer. A series circuit of a zener diode D1 and a diode D2 is arranged in parallel with the primary winding W1 and limits the voltage across the primary winding W1 when the current through the primary winding W1 is interrupted. The main current path of a switching transistor T2, comprising a bipolar NPN transistor, is connected in series with the primary winding W1. The which transistor has its second main electrode or collector coupled to the primary winding W1. The first main electrode or emitter of the switching transistor T2 is connected to a first terminal N1 of a secondary winding W2 of the transformer via a resistor R3, which secondary winding is magnetically coupled to the primary winding W1. The secondary winding W2 also has its first terminal N1 connected to a load to be powered, which is for example a rechargeable battery B. The positive terminal of the battery B is connected to the first terminal N1. The negative terminal of the battery B is connected to a terminal N6, which is connected to a second terminal N2 of the secondary winding W2 via a diode D3. The terminal N6 is, for example, connected to ground. As a result of this, not only the current through the secondary winding but also the current through the primary winding flow through the battery B. If this is not desirable, the first terminal N1, instead of the terminal N6, may be connected to ground. The control electrode or base of the switching transistor is connected to a supply terminal N3 via a resistor R6. This supply terminal can be connected directly to the positive terminal N7, but in the case of varying input voltages it is preferred to stabilize the voltage at the supply terminal N3, for example, by means of zener diode D7 connected between the supply terminal N3 and the terminal N6 (ground) and by means of a supply resistor R2 between the supply terminal N3 and the positive terminal N7. A series arrangement of a capacitor C3 and a resistor R5 is connected between the base of the switching transistor T2 and the second terminal N2 of the secondary winding W2. Furthermore, the switching transistor T2 has its base connected to the first terminal N1 via a threshold element comprising a zener diode D5 in series with a diode D6, which conducts when the zener diode D5 breaks down. A threshold element is to be understood to mean an element having a comparatively high impedance as long as the voltage across the element is below a given threshold voltage, and which has a comparatively low impedance when the voltage across the element exceeds the threshold voltage. This category includes the zener diode, the diac and the gas-filled regulator tube.

When the input voltage is received a starting current will flow from supply terminal N3, via the resistor R6, to the base of the switching transistor T2, which is consequently turned on. The forward interval or forward phase begins. Now a current starts to flow from the positive terminal N7 to the terminal N6 via the primary winding W1, the switching transistor T2, the resistor R3 and the battery B. The voltage difference across the primary winding W1 induces a transformed voltage difference across the secondary winding W2, the second terminal N2 then being positive relative to the first terminal N1. The cathode of the diode D3 is then positive relative to the anode of the diode D3, as a result of which the diode D3 is cut off. The positive voltage difference across the secondary winding W2 has a positive-feedback effect and drives the base-emitter junction of the switching transistor T2 further into conduction via the capacitor C3, the drive current being limited by the resistor RS. The switching transistor T2 is bottomed and an increasing current begins to flow through the primary winding W1. This increasing current produces an increasing voltage drop across the resistor R3. When the sum of the base-emitter-junction voltage of the switching transistor T2 and the voltage drop across the resistor R3 is equal to the threshold voltage of the threshold element, in the present case the sum of the zener voltage of the zener diode D5 and the junction voltage of the diode D6, the base of the switching transistor T2 is short-circuited to the first terminal N1. The switching transistor T2 is consequently turned off and the current through the primary winding W1 is interrupted. Now the flyback interval or flyback phase begins, in which the energy stored in the transformer is transferred to the battery B. The peak current at which the switching transistor T2 is turned off does not depend on the voltage across the battery B because the threshold element has been arranged in parallel with the base-emitter junction of the switching transistor T2 and the resistor R3. Therefore, a short-circuited battery B or another load can never result in an excessive peak current through the switching transistor.

The interruption of the current through the primary winding W1 gives rise to a large voltage increase across the primary winding W1, which voltage increase is positive relative to the input voltage on the positive supply terminal N7 and which is limited by the diode D2 and the zener diode D1. As a result of the current interruption, the sign (polarity) of the voltage across the primary winding W1 and, as a consequence, that of the voltage across the secondary winding W2 is reversed. The second terminal N2 of the secondary winding W2 is now negative relative to the first terminal N1. The diode D3 now conducts and a secondary current flows in the secondary circuit formed by the secondary winding W2, the diode D3 and the battery B, the energy in the transformer being transferred to the battery. The secondary current decreases to zero. As long as the diode D3 conducts, the negative voltage across the secondary winding W2 is equal to the sum of the voltage across the diode D3 and the voltage of the battery B. The negative voltage transient across the secondary winding W2 appears across the capacitor C3 and keeps the base of the switching transistor T2 negative relative to the emitter. The diode D6 prevents the capacitor C3 from being discharged via the zener diode D5, which is now poled in the forward direction. The switching transistor T2 will now remain cut off until the capacitor C3 has been recharged via the resistors R6 and R5 to such an extent that the voltage on the base of the switching transistor T2 is again sufficiently positive relative to the emitter and a new oscillation cycle is started. As a result of this, the power-supply circuit is self-oscillating.

The time necessary to charge the capacitor C3, and hence the repetition frequency of the oscillation cycle, is mainly determined by the resistance of the resistor R6 because in practice the resistance of the resistor R5 is negligible. The power-supply circuit waits until the capacitor C3 has been recharged sufficiently via the resistor R6. Thus, the flyback interval is followed by a waiting interval. A substantially fixed amount of energy is transferred to the battery B or to another load in each oscillation cycle. The repetition frequency of the oscillation cycle consequently determines the average charging current which flows into the battery B. The average charging current can be fixed by an appropriate choice of the resistance of the resistor R6. The power-supply circuit shown in FIG. 1 is particularly suitable as a slow charger or trickle charger for rechargeable batteries.

The charging process of the capacitor C3 is also determined by the positive voltage difference across the secondary winding W2 in the forward interval. This voltage difference is proportional to the input voltage on the positive supply terminal N7, which in its turn is proportional to the rectified mains voltage, which can vary from nominal 100 V to nominal 240 V. The higher the mains voltage, the longer it takes for the capacitor C3 to be charged. When the peak current at which the switching transistor T2 is turned off is reached more rapidly owing to a higher mains voltage, the charging time of the capacitor C3 becomes longer. As a result of this, the repetition frequency is adapted and a compensation for the varying mains voltage is obtained.

The switching transistor T2 is a bipolar transistor. However, alternatively other types of transistor can be used for this purpose. Examples of this include a Darlington transistor, a unipolar MOS transistor, whose first main electrode, second main electrode and control electrode correspond to the source, drain and gate, respectively, or an insulated gate bipolar transistor (IGBT).

Figure 2:
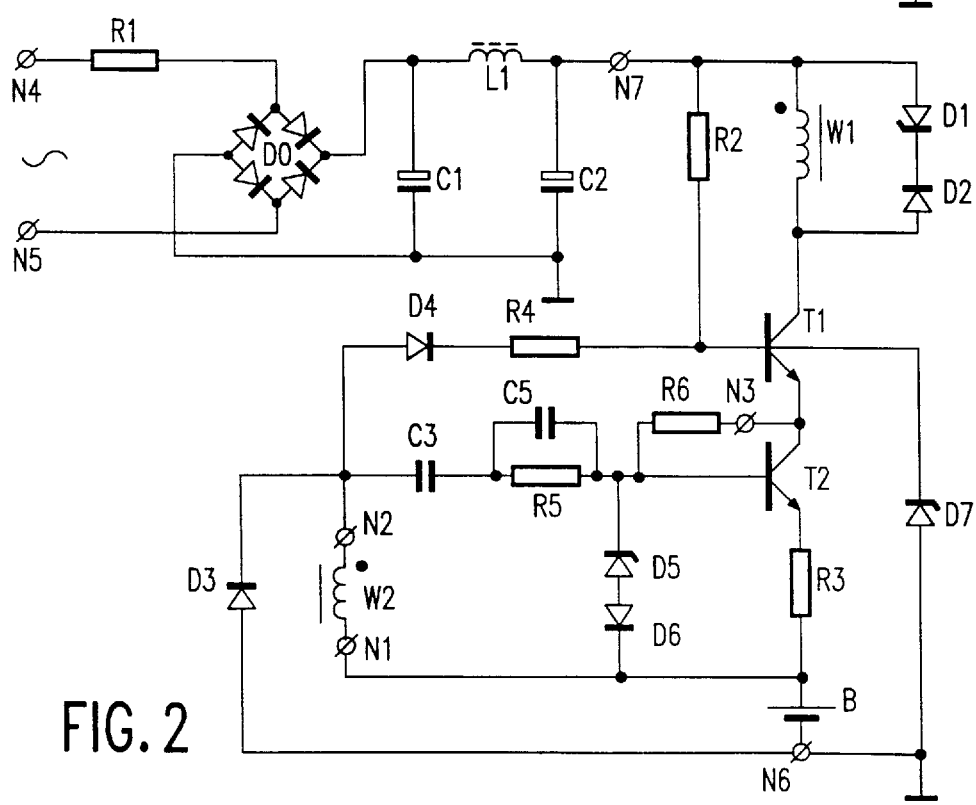
FIG. 2 shows an embodiment-of a power-supply circuit in accordance with the invention.

FIG. 2 shows the circuit diagram of a more elaborate embodiment of the power-supply circuit in accordance with the invention. A speed-up capacitor C5 is arranged across the resistor R5 to speed up the turn-on of the switching transistor T2. Moreover, a cascode transistor T1 is arranged in series with the switching transistor T2, which cascode transistor is, for example, an NPN bipolar transistor having its emitter connected to the collector of the switching transistor T2, having its collector coupled to the primary winding W1 and having its base connected to the node between the supply resistor R2 and the zener diode D7. The supply terminal N3, to which the resistor R6 is connected, is now formed by the emitter of the transistor T1. The supply terminal N3 supplies a stabilized voltage, which is determined by the zener diode D7 and which is actively buffered by the switching transistor T1. When the cut-off point of the switching transistor T2 is reached, the voltage variation on the emitter of the transistor T1 is much larger than the voltage variation on the emitter of the switching transistor T2. As a result, the transistor T1 is turned off rapidly in comparison with the switching transistor T2. The transistor T1 also limits the voltage on the collector of the switching transistor T2. This limits the dissipation in the switching transistor T2, and a low-voltage type can be selected for this transistor.

During starting the transistor T1 receives base current via the resistor R2 and is turned on. The voltage on the supply terminal N3 is then stabilized by the zener diode D7. The switching transistor T2 then remains cut off because the capacitor C3 must still be charged via the resistor R6. As soon as the switching transistor T2 is turned on, the voltage on the supply terminal N3 decreases because both transistors T1 and T2 are driven into saturation. The zener diode D7 is then cut off. After the switching transistor T2 has been turned off the zener diode D7 is turned on and the transistor T1 limits the collector voltage of the switching transistor T2 to a value determined by the zener voltage of the zener diode D7 and the base-emitter voltage of the transistor T1.

The supply resistor R2 supplies the bias current for the zener diode D7 and its resistance is preferably selected to be as high as possible in order to minimize the dissipation. However, its resistance may be too high to supply enough base current to the transistor T1 when the switching transistor T2 draws current from the transistor T1. This is overcome by means of the diode D4 and the limiting resistor R4, which are connected in series between the second terminal N2 of the secondary winding W2 and the base of the transistor T1. Thus, the positive feedback of the positive voltage across the secondary winding W2 in the forward interval is also effective to drive the base of the transistor T1. In the flyback interval the voltage across the secondary winding W2 is reversed and becomes negative. The diode D4 is then cut off in order to prevent the voltage stabilization for the voltage on the base of the transistor T1 from being disturbed.

When the threshold voltage of the zener diode DS is reached a current flows through the secondary winding W2, the capacitor C3, the resistor R5, the zener diode D5 and the diode D6. This current is dependent on the positive voltage appearing across the secondary winding in the forward interval. The positive voltage, in its turn, depends on the mains voltage. In the case of a high mains voltage the current through the zener diode D5 is consequently larger than in the case of a low mains voltage. The internal resistance of the zener diode D5 gives rise to a varying threshold voltage, as a result of which the cut-off point of the switching transistor T2 is dependent on the mains voltage. However, zener diodes having a low internal resistance are at the same time types having a higher zener voltage of more than 5 V. This is undesirable if the secondary voltage of the transformer is low for energizing batteries with low voltage and if the resistance value of the resistor R3 should be small in order to minimize the dissipation.

Figure 3:
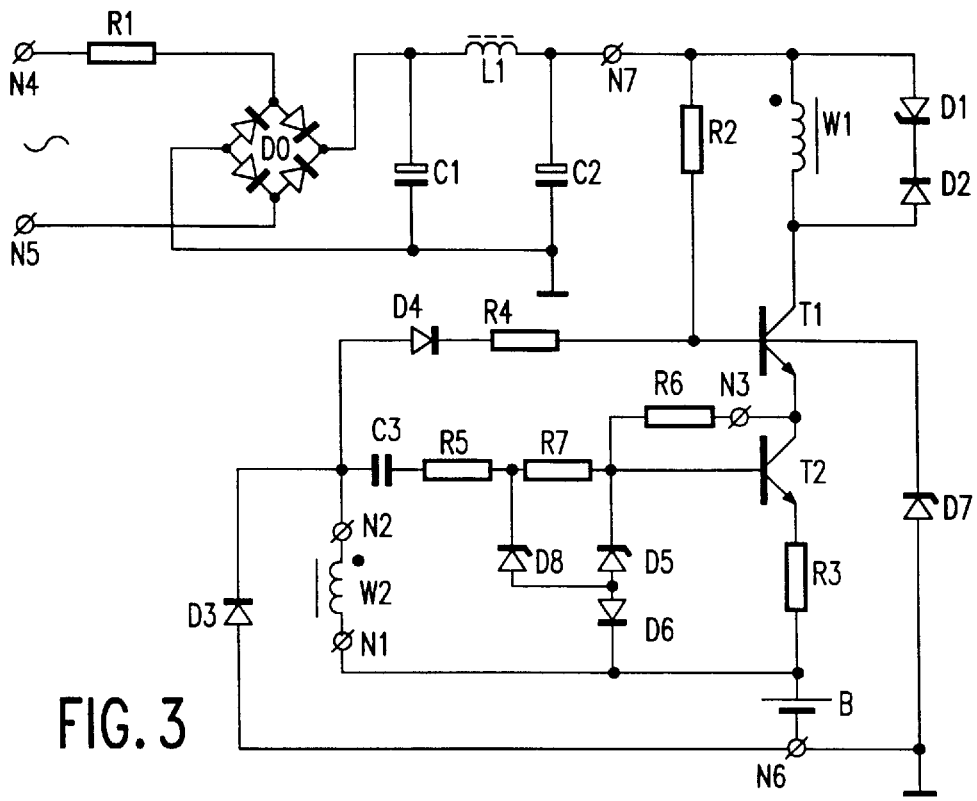
FIG. 3 shows an embodiment of a power-supply circuit in accordance with the invention.

FIG. 3 shows an embodiment comprising a threshold element having a smaller variation in threshold voltage. A resistor R7 is arranged between the resistor R5 and the base of the switching transistor T2. The node between the resistors R5 and R7 is connected to the anode of the diode D6 via an additional zener diode D8. The zener voltage of the additional zener diode D8 is higher than that of the zener diode D5. The additional zener diode D8 limits the voltage across the secondary winding W2 to a substantially constant value, so that the current through the zener diode D5 is substantially constant and its threshold voltage hardly depends on the mains voltage any longer. Thus, it is still possible to select low-voltage types with a comparatively high internal resistance for the zener diodes DS and D8.

Figure 4:
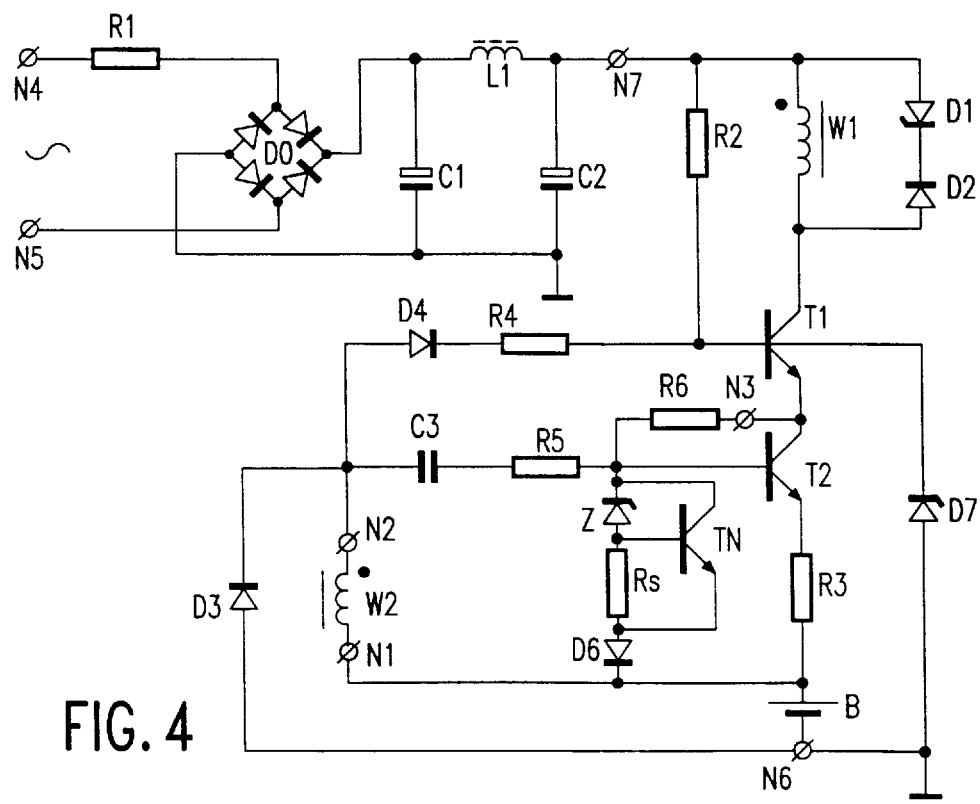
FIG. 4 shows an embodiment of a power-supply circuit in accordance with the invention.

FIG. 4 shows an embodiment using an alternative solution for the varying threshold voltage of the zener diode D5. The zener diode D5 has now been replaced by a zener diode Z in series with a resistor Rs. The collector-emitter path of an NPN transistor TN is arranged in parallel therewith, which transistor has its base connected to the node between the zener diode Z and the resistor Rs. The transistor TN handles most of the current which otherwise would flow through the zener diode Z. The base-emitter voltage of the transistor TN stabilizes the voltage drop across the resistor Rs and the current through the zener diode Z.

The zener diode D7 is connected to the terminal N6. This means that the voltage of the battery B is one of the factors which determine the stabilized voltage on the supply terminal N3, which stabilized voltage, as already explained, is a measure of the length of the waiting interval and the repetition frequency of the oscillation cycle. If the zener diode D7 had been connected to the positive terminal of the battery B, the waiting interval would have become independent of the battery voltage. However, by connecting the zener diode D7 to the negative terminal of the battery B, the power-supply circuit is protected against an interrupted or missing battery. In the case of an interrupted battery no current can flow through the switching transistor T2, as a result of which no base current flows to the transistor T1. The transistors T1 and T2 remain cut off, while the voltage on the supply terminal N3 is limited to a safe value for the switching transistor T2. Consequently, the transistor T2 cannot break down, which would be possible if the zener diode D7 had been connected to the positive terminal of the battery B.

Figure 5:
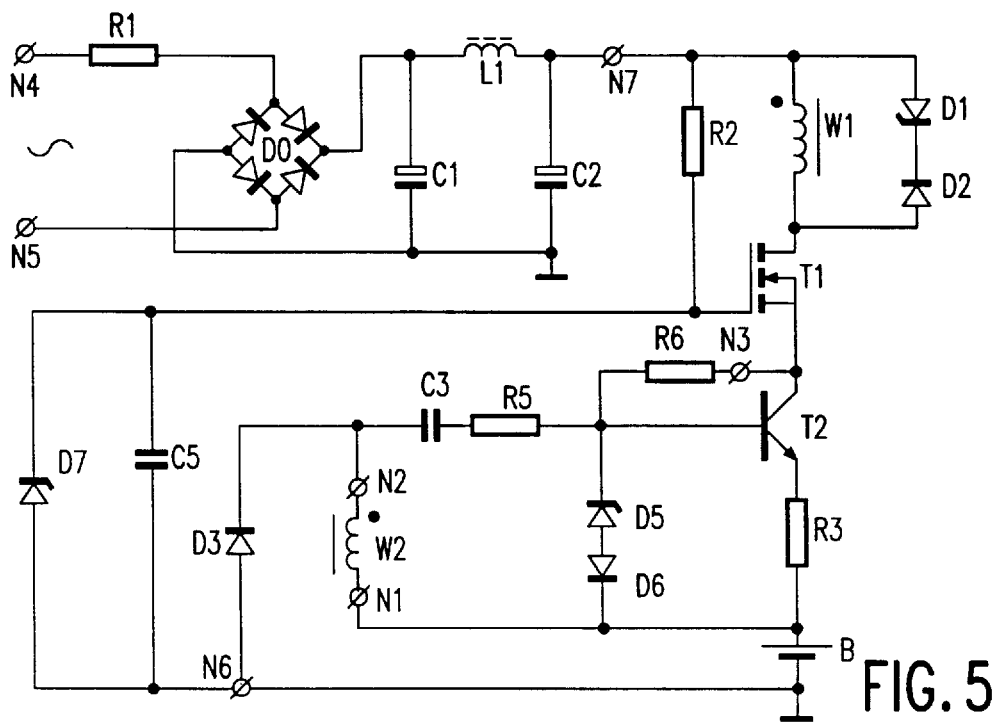
FIG. 5 shows an embodiment of a power-supply circuit in accordance with the invention.

FIG. 5 shows an embodiment in which the cascode transistor T1 comprises a MOS transistor. Since the gate of the transistor T1 draws hardly any current when this transistor is turned on, the diode D4 and the resistor R4 can be dispensed with. An optional capacitor C5 is connected across the zener diode D7 in order to cope with possible transients on the gate of the transistor T1. In contrast with the embodiments using a bipolar transistor T1, the zener diode D7 remains conductive when the switching transistor T2 is turned on. The voltage on the source electrode of the transistor T1 decreases when the switching transistor T2 is saturated. The increased gate-source voltage brings the transistor T1 into the desired state of conduction.

The diode D6 inhibits rapid charging of the third capacitor C3. The presence of this diode D6 enables the power-supply circuit to be switchable between a comparatively high repetition frequency and a comparatively low repetition frequency. By short-circuiting the diode D6 the negative voltage transient across the capacitor C3 can be compensated rapidly in the flyback interval because the zener diode D5 then operates as a diode poled in the forward direction. As a result of this, the base voltage of the switching transistor T2 more rapidly assumes the positive value which is adequate to drive the switching transistor T2 into conduction again. The repetition frequency of the oscillation cycle then becomes substantially higher, as a result of which the average value of the current supplied to the battery B or another load increases. By means of a switch across the diode D6 it is thus possible to change over from slow charging to rapid charging of the battery B. The switch can be a hand-operated electrical switch (not shown) or a transistor switch.

Figure 6:
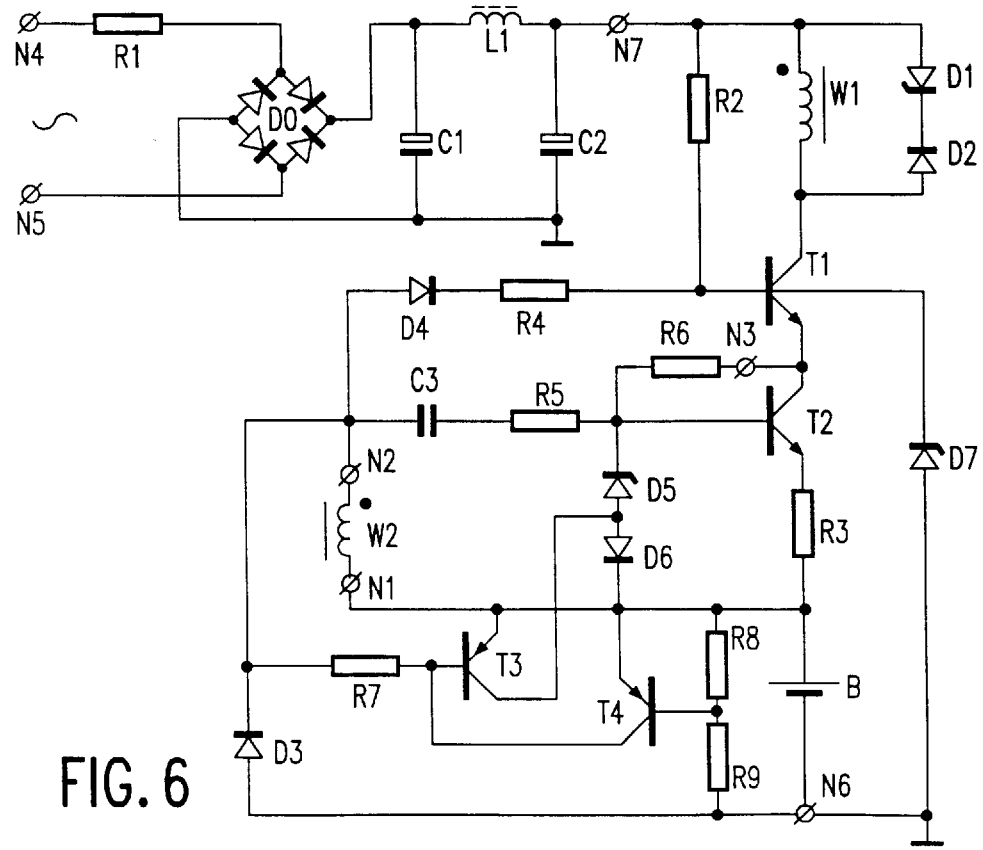
FIG. 6 shows an embodiment of a power-supply circuit in accordance with the invention.

FIG. 6 shows an embodiment having an electronic switch, which by way of example comprises a bipolar PNP transistor T3, having its emitter connected to the first terminal N1, its collector to the anode of the diode D6, and its base to the second terminal N2 via a current-limiting resistor R7. In the flyback interval the second terminal N2 is negative relative to the first terminal N1, as a result of which the transistor T3 is turned on and short-circuits the diode D6. In order to prevent the voltage of the battery B from increasing excessively and the battery B from being overcharged, there has been provided a battery voltage sensor and a switch which stops the drive to the transistor T3 if the battery voltage exceeds a given value. The voltage sensor takes the form of a voltage divider comprising the resistors R8 and R9 connected in series across the battery B. By way of example, the switch again comprises a PNP transistor T4 having its emitter connected to the first terminal N1, its collector to the base of the transistor T3, and its base to the tap of the voltage divider. When the battery voltage exceeds a given value, the transistor T4 is turned on and the base-emitter junction of the transistor T3 is short-circuited. Instead of bipolar transistors it is also possible to use unipolar (MOS) transistors for the transistors T3 and T4. By means of a suitable interface circuit the transistor T4 can also be driven by a signal which is a measure of another battery condition, for example, a signal responsive to the temperature of or the pressure in the battery to be charged. In the forward interval the transistor T3 is protected against an excessive base-emitter voltage by means of the resistor R7, the voltage divider R8, R9 and the conducting collector-base junction of the transistor T4.

Figure 7:
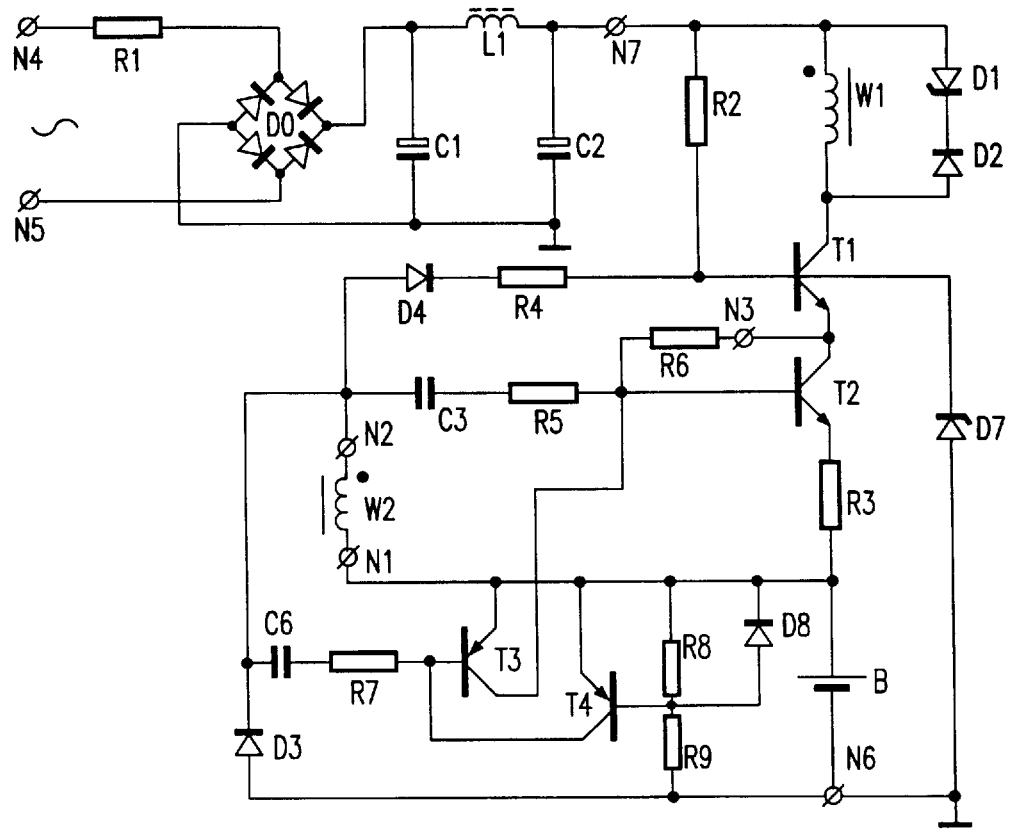
FIG. 7 shows an embodiment of a power-supply circuit in accordance with the invention.
Figure 8:
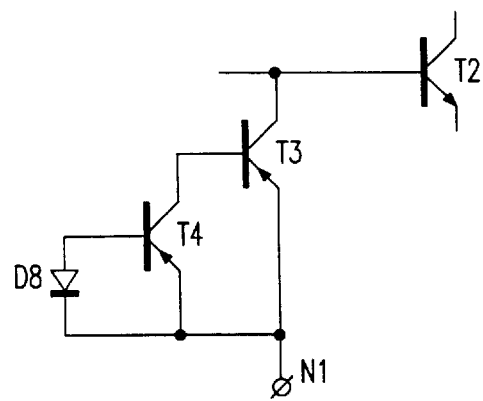
FIG. 8 shows a part of the embodiment shown in FIG. 7.

The presence of the transistor T3 and the transistor T4 makes it possible to avoid the use of the zener diode D5 and the resulting variation in the cut-off point of the switching transistor T2. FIG. 7 shows an embodiment without the zener diode D5. The diode D6 has also been dispensed with. The resistor R7 is now connected to the second terminal N2 via a capacitor C6. Moreover, a diode D8 is connected across the base-emitter junction of the transistor T4, the anode of the diode D8 being connected to the base of the transistor T4. FIG. 8 shows how the transistors T3 and T4 and the diode D8 operate in the forward interval. The collector-base junctions of both the transistor T3 and T4 are then conductive. The threshold voltage is then equal to the sum of three junction voltages (approximately 2.1 V). When their collector-base junctions conduct the transistors T3 and T4 will operate in the reverse mode, i.e. the collector operates as the emitter and the emitter as the collector. The internal resistance of the threshold element thus obtained depends, inter alia, on the current gain of the transistors in the reverse mode, which should therefore be adequate, particularly for the transistor T3. In the flyback interval the transistors T3 and T4 operate again as described for the embodiment shown in FIG. 6. The capacitor C6 prevents the starting current from being drained to the battery B via the collector-base junction of the transistor T3, the resistor R7 and the secondary winding.

Figure 9:
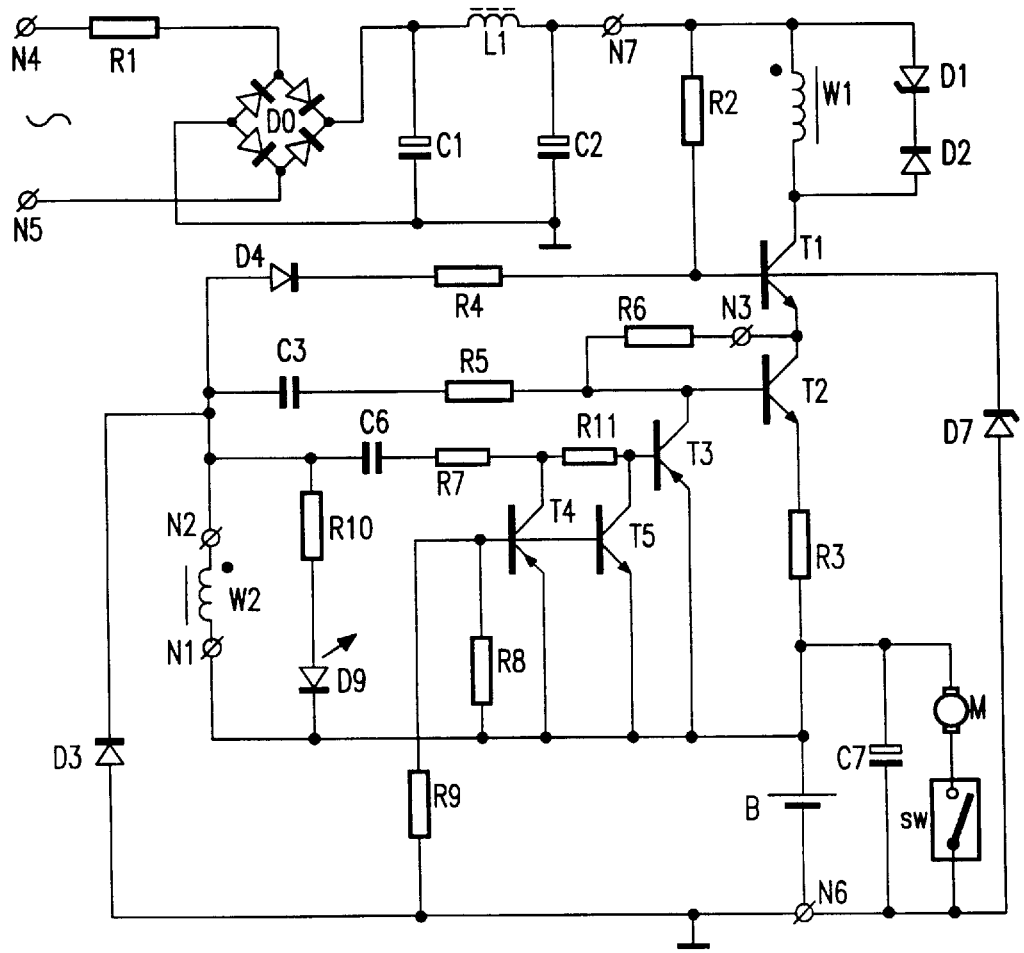
FIG. 9 shows an embodiment of a power-supply circuit in accordance with the invention.
Figure 10:
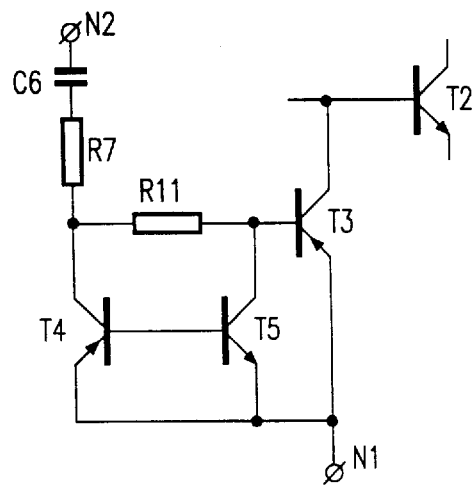
FIG. 10 shows a part of the embodiment shown in FIG. 9.

FIG. 9 shows an embodiment which enables the influence of the varying mains voltage to be compensated even further. The diode D8 of the circuit arrangement shown in FIG. 7 has been replaced by an NPN transistor T5 having its emitter connected to the first terminal N1, its collector to the base of the transistor T3, and its base to the base of the transistor T4. Furthermore, the transistor T4 has its collector connected to the base of the transistor T3 via a resistor R11. By means of the resistor R11 the degree of compensation can be adjusted. FIG. 10 illustrates the situation in the forward interval. The threshold voltage is the sum of the collector-base voltage of the transistor T3 and the collector-emitter voltage of the transistor T5. The voltage on the collector of the transistor T4, which is the sum of the collector-base voltage of the transistor T4 and the base-emitter voltage of the transistor T5, is maintained constant by the transistor T5 in that it withdraws just as much current from the collector of the transistor T4 as is supplied by the resistor R7. As a result, the voltage on the collector of the transistor T5 will decrease by a factor which is determined by the ratio between the resistors R11 and R7 and which is proportional to the current supplied by the resistor R7. Since the resistor R7 is connected to the second terminal N2 of the secondary winding W2 via the capacitor C6, the voltage on the collector of the transistor T5 decreases and increases as a linear function of the mains voltage. As a result, the turn-off instant of the switching transistor T2 varies proportionally to the mains voltage.

The capacitor C6 inhibits leakage of the starting current to the battery B via the collector-base junction of the transistor T3, the resistors R11 and R7 and the secondary winding W2. For the same reason, the resistor R7 has not been connected to the capacitor C3 to enable the capacitor C4 to be dispensed with, because then the starting current would leak away via the resistor R7, the collector-base junction of the transistor T4 and the resistor R8. As the average voltage across the secondary winding W2 is zero and the impedances of the charging and discharging path for the capacitor C6 are substantially equal, the average voltage across the capacitor C6 will also be substantially zero. If the time constant of the resistor R7 and the capacitor C6 is large relative to the switching cycle time, the influence of the capacitor C4 on the mains voltage compensation will be negligible. However, it appears that even in the case of a small time constant the mains voltage compensation is still satisfactorily adjustable.

FIG. 9 further shows a motor M, which can be connected to the battery B by means of a switch SW. Moreover, a smoothing capacitor C7 has been provided for additional interference suppression. The motor M can be the motor of a shaver comprising rechargeable batteries, which are charged from the mains voltage. Operation of the power-supply circuit is indicated by means of a LED D9, which is connected to the terminals N1 and N2 of the secondary winding W2 by a series resistor R10.

Figure 11A:
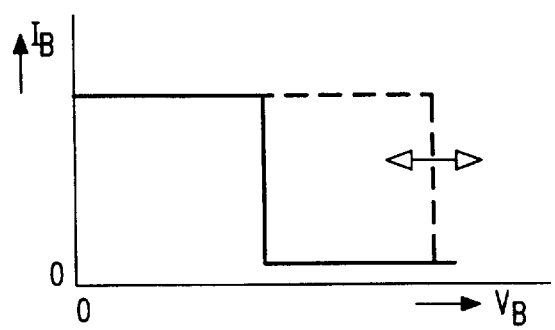
FIGS. 11A and 11B are diagrams to explain the operation of control functions in an embodiment of a power-supply circuit in accordance with the invention.
Figure 12:
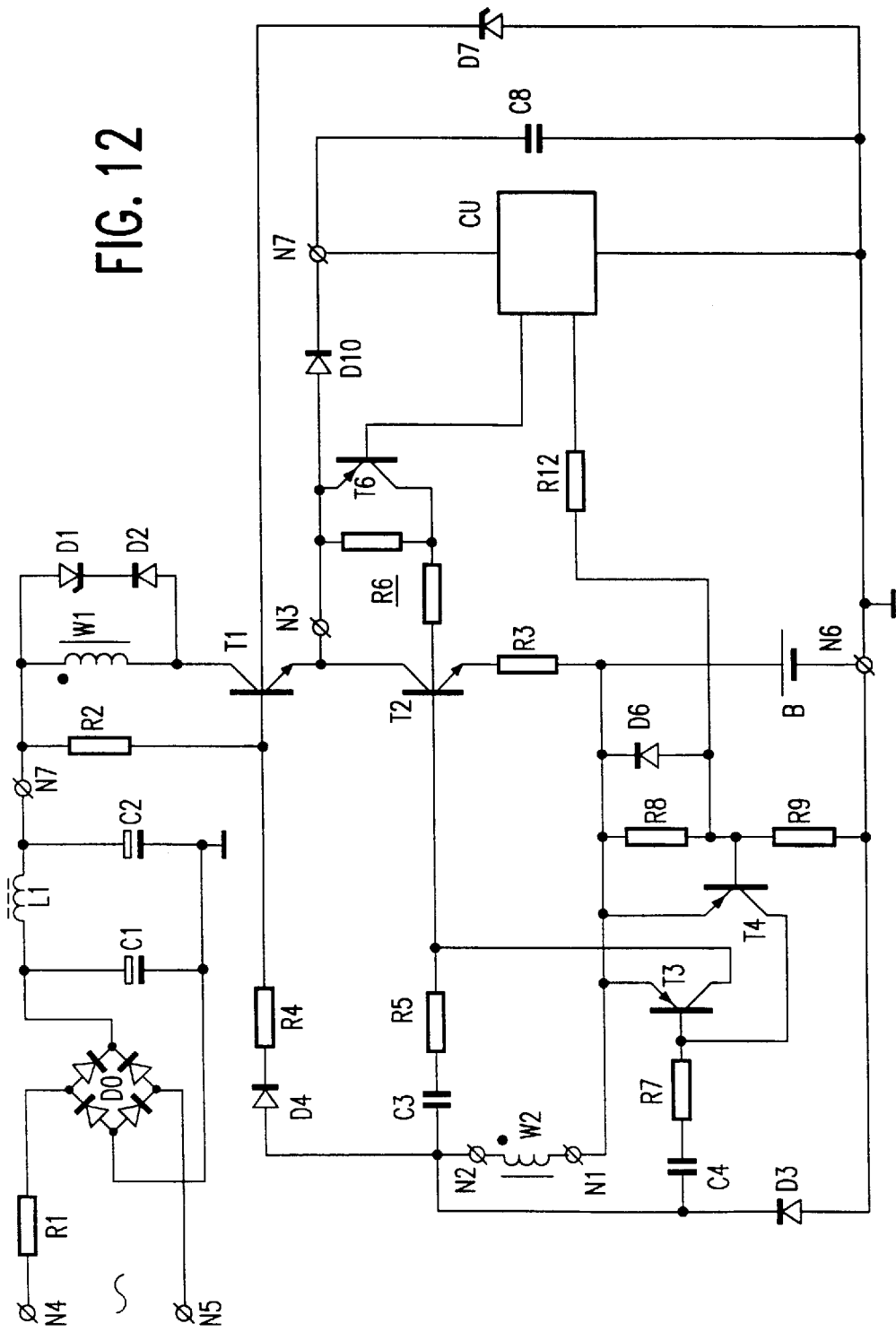
FIG. 12 shows an embodiment of a power-supply circuit in accordance with the invention.

The change-over point from rapid charging to slow charging and vice versa can be influenced in various manners. FIG. 11A illustrates a first method, which is based on influencing of the battery voltage measured by means of the voltage divider R8, R9. The average charging current $I_B$ through the battery is then changed over from a high to a low value at another battery voltage $V_B$. FIG. 12 shows an embodiment comprising a control unit CU, which varies the voltage on the tap of the voltage divider R8, R9 via a resistor R12. The control unit can effect this in response to various parameters, such as the temperature of the battery, rotation or non-rotation of the motor M (not shown in FIG. 12), the voltage variation of the battery during charging, the elapsed time, or on the basis of any other form of battery management.

Figure 11B:
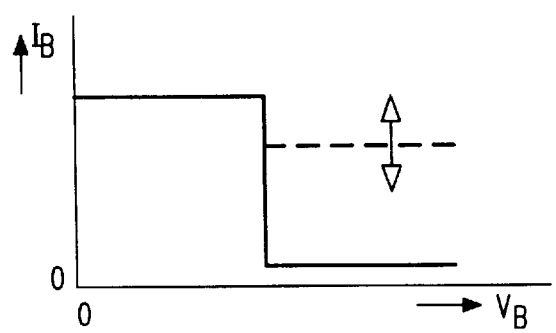

However, It is also possible to vary the value of the resistor R6, as a result of which the comparatively small slow-charging current is increased to a comparatively large rapid-charging current, as illustrated in FIG. 11B. For this purpose the resistor R6 in FIG. 12 has been split into two resistors, of which one resistor can be short-circuited by means of a transistor T6, which is controlled by the control unit CU. The transistor T6 can be turned on and turned off by means of a digital control signal in order to change over the resistance value of the resistor R6, or by means of an analog signal in order to enable the resistance to be modulated.

The control unit receives its supply voltage from a supply terminal N7, which is connected to the supply terminal N3 via a diode D4 and to ground via a smoothing capacitor C8. The diode D10 is cut off when the switching transistor T2 conducts and prevents the smoothing capacitor C8 from being discharged. Since the transistor T1 forms an active buffer for the stabilized voltage on its base, the smoothing capacitor C4 can be comparatively small.

Figure 13:
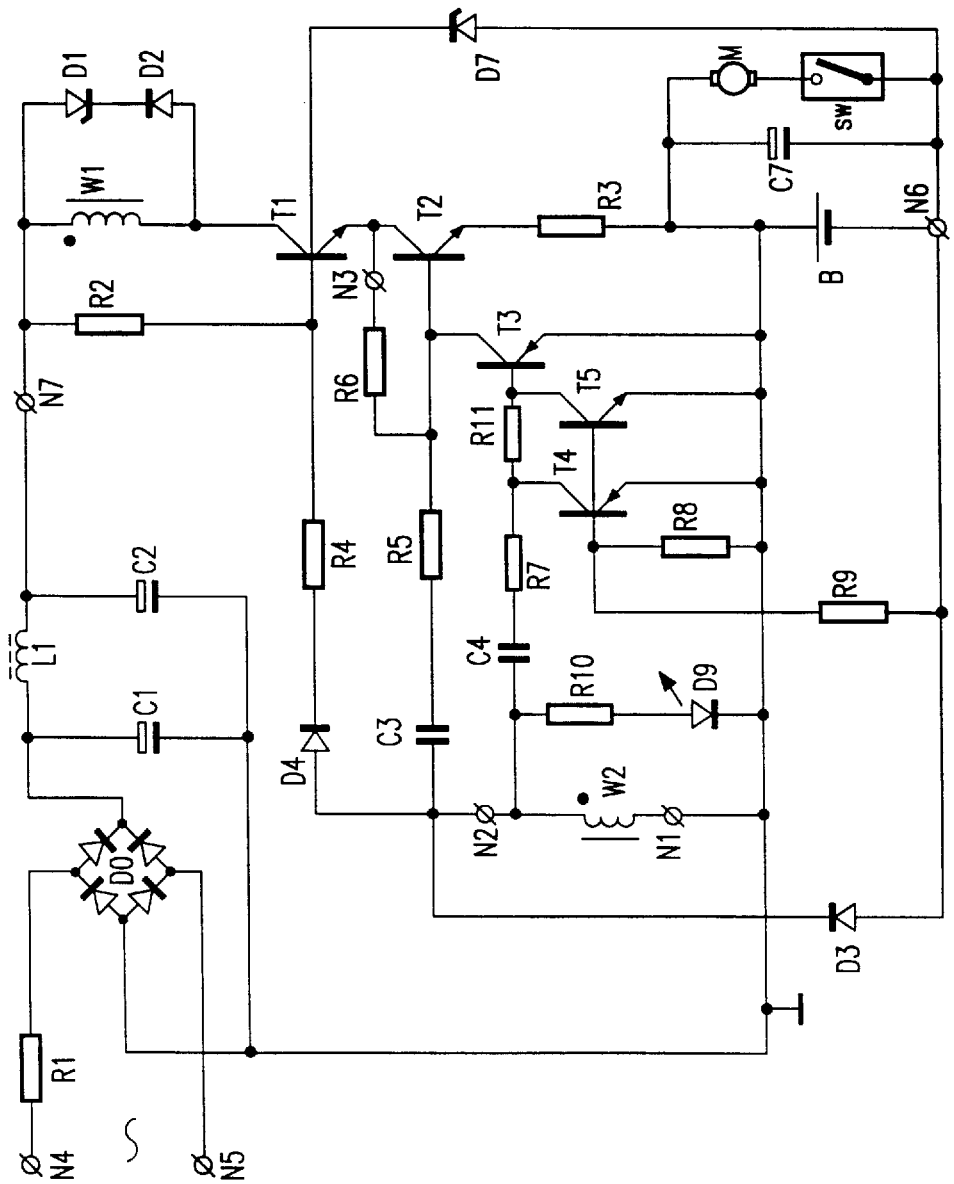
FIG. 13 shows an embodiment of a power-supply circuit in accordance with the invention.

FIG. 13 shows an embodiment in which the positive terminal of the battery B instead of the negative terminal of the battery B is connected to ground. By way of example this has been applied to the embodiment shown in FIG. 9, but any other one of the embodiments described hereinbefore can be modified accordingly. The result is that the current through the primary winding W1 no longer flows through the battery B and the load. Likewise, the anode of the zener diode D7 may at option be connected to the positive terminal or negative terminal of the battery B. However, the previously described protection against an interrupted or missing battery operates only if the zener diode D7 has been connected to the negative terminal of the battery B.

Figure 14:
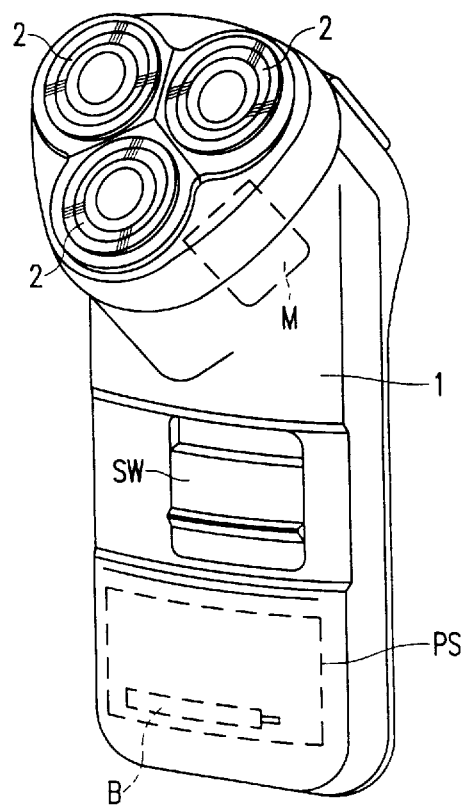
FIG. 14 shows an electric shaver comprising a rechargeable battery and a power-supply circuit in accordance with the invention.

FIG. 14 shows an electric shaver having a housing 1, which accommodates the power-supply circuit PS, the battery B and the motor M. The motor drives the shaver heads 2 and is operated by means of the switch SW.

I claim:

1. A power-supply circuit for powering a load from an input voltage, comprising: a transformer having a primary winding and a secondary winding, a switching transistor having a control electrode and having a first main electrode and a second main electrode which define a main current path of the switching transistor, which main current path is connected in series with the primary winding; a first resistor connected between the first main electrode and a first terminal of the secondary winding; a first diode connected in series with the load, between a second terminal of the secondary winding and the first terminal of the secondary winding; a series arrangement of a first capacitor and a second resistor connected between the second terminal and the control electrode; a third resistor connected between the control electrode and a supply terminal; a threshold element for limiting the voltage on the control electrode and connected between the control electrode and the first terminal, and a second diode connected a in series with the threshold element, which second diode conducts during limitation of the voltage on the control electrode of the switching transistor.

2. A power-supply circuit as claimed in claim 1, further comprising switch connected in parallel with the second diode to short-circuit the second diode.

3. A power-supply circuit as claimed in claim 2, further comprising for opening and closing the switch in response to a signal which is a measure of a condition of the load to be powered.

4. A power-supply circuit as claimed in claim 3, second diode has a first electrode connected to the first terminal of the secondary winding and a second electrode to the threshold element, and the switch comprises: a first transistor having a first main electrode connected to the first terminal, a second main electrode coupled to the second electrode of the second diode, and a control electrode coupled to the second terminal of the secondary winding; a second transistor having a first main electrode connected to the first terminal, a second main electrode coupled to the control electrode of the first transistor, and a control electrode; and a voltage divider, connected across the load and having a tap to which the control electrode of the second transistor is connected.

5. A power-supply circuit as claimed in claim 1, wherein the threshold element comprises: a first bipolar transistor having an emitter connected to the first terminal a collector coupled to the control electrode of the switching transistor, and a base coupled to the second terminal of the secondary winding; a second bipolar transistor having an emitter connected to the first terminal, a collector coupled to the base of the first bipolar transistor, and a base connected to the first terminal via a further diode; and a voltage divider, connected across the load and having a tap connected to the base of the second bipolar transistor.

6. A power-supply circuit as claimed in claim 1, wherein the threshold element comprises: a first bipolar transistor having an emitter connected to the first terminal, a collector coupled to the control electrode of the switching transistor, and a base coupled to the second terminal of the secondary winding via a series resistor; a second bipolar transistor having an emitter connected to the first terminal, a collector coupled to the base of the first bipolar transistor via the series resistor, and a base; a third bipolar transistor of an opposite conductivity type, having an emitter connected to the first terminal, a collector coupled to the base of the first bipolar transistor, and a base; and a voltage divider, connected across the load and having a tap connected to the base of the second bipolar transistor and to the base of the third bipolar transistor.

7. A power-supply circuit as claimed in claim 1, further comprising means for stabilizing the voltage of the supply terminal with respect to variations in the input voltage.

8. A power-supply circuit as claimed in claim 1, wherein the power-supply circuit further comprises: a further transistor having a first main electrode coupled to the second main electrode of the switching transistor and to the third resistor, a second main electrode coupled to the primary winding and a control electrode connected to receive a voltage which is stabilized with respect to variations in the input voltage.

9. A power-supply circuit as claimed in claim 8, wherein the control electrode of the further transistor is connected to receive the input voltage via a resistor, and is connected to a node between the load and the first diode via a further threshold element.

10. A power-supply circuit as claimed in claim 8 wherein the power-supply circuit further comprises: a series arrangement of a diode and a resistor connected between the control electrode of the further transistor and the second terminal of the secondary winding.

11. A power-supply circuit as claimed in claim 8, wherein the power-supply circuit further comprises: a diode connected between the first main electrode of the further transistor and a further supply terminal, and a smoothing capacitor connected to the further supply terminal.

12. A power-supply circuit as claimed in claim 7, wherein at least a part of the third resistor comprises a variable or adjustable resistor.

13. A power-supply circuit as claimed in claim 4, wherein the power-supply circuit comprises means for influencing a voltage on the tap of the voltage divider.

14. A power-supply circuit as claimed in claim 1, wherein the threshold element comprises a zener diode.

15. A power-supply circuit as claimed in claim 1, wherein threshold element comprises: a further series resistor, connected between the series arrangement of the first capacitor and the second resistor and the control electrode of the switching transistor; a first zener diode, connected to the control electrode of the switching transistor; and a second zener diode, connected to the control electrode of the switching transistor via the further series resistor.

16. A power-supply circuit as claimed in claim 1, wherein threshold element comprises: a series arrangement of a zener diode and a further series resistor, and a bipolar transistor having a base connected to a node coupling the zener diode and the further series resistor, and having a main current path connected in parallel with the series arrangement of the zener diode and the further series resistor.

17. A power-supply circuit as claimed in claim 1, wherein a second capacitor is connected in parallel with the second resistor.

18. A power-supply circuit as claimed in claim 9, wherein the further threshold element comprises a zener diode.

19. An electric shaver comprising: a rechargeable battery, an electric motor, a switch for connecting the motor to the battery, and a power-supply circuit as claimed in claim 1, coupled to at least one of the battery and the motor.

20. A power-supply circuit for a load, comprising:
a transformer having a primary winding and a secondary winding,
a switching transistor having a control electrode and first and second main electrodes which define a main current path of the switching transistor, said main current path being connected in series with the primary winding,
a first resistor connected between the first main electrode and a first terminal of the secondary winding,
a first diode connected in series with the load between a second terminal of the secondary winding and the first terminal of the secondary winding,
a series arrangement of a first capacitor and a second resistor connected between the second terminal and the control electrode, a third resistor connected between the control electrode and a supply terminal, and
threshold means for limiting the voltage on the control electrode, wherein the threshold means comprise;
a first transistor having an emitter connected to the first terminal, a collector coupled to the control electrode of the switching transistor and a base coupled to the second terminal of the secondary winding,
a second transistor having an emitter connected to the first terminal, a collector coupled to the base of the first transistor and a base connected to the first terminal via a further diode, and
a voltage divider connected across the load and having a tap connected to the base of the second transistor.

21. A power-supply circuit for a load, comprising:
a transformer having a primary winding and a secondary winding,
a switching transistor having a control electrode and first and second main electrodes which define a main current path of the switching transistor, said main current path being connected in series with the primary winding,
a first resistor connected between the first main electrode and a first terminal of the secondary winding,
a first diode connected in series with the load between a second terminal of the secondary winding and the first terminal of the secondary winding,
a series arrangement of a first capacitor and a second resistor connected between the second terminal and the control electrode,
a third resistor connected between the control electrode and a supply terminal, and
threshold means for limiting the voltage on the control electrode, wherein the threshold means comprise;
a first transistor having an emitter connected to the first terminal, a collector coupled to the control electrode of the switching transistor and a base coupled to the second terminal of the secondary winding via a series resistor,
a second transistor having an emitter connected to the first terminal, a collector coupled to the base of the first transistor via the series resistor, and a base,
a third transistor of an opposite conductivity type and having an emitter connected to the first terminal, a collector coupled to the base of the first transistor, and a base, and
a voltage divider connected across the load and having a tap connected to the base of the second transistor and to the base of the third transistor.

22. A power-supply circuit for a load, comprising:
an input terminal for connection to a source of supply voltage for the power supply circuit,
a transformer having a primary winding and a secondary winding,
a switching transistor having a control electrode and first and second main electrodes which define a main current path of the switching transistor,
first means for coupling the primary winding, the main current path of the switching transistor and a first resistor in a first series circuit between the input terminal and a first terminal of the secondary winding,
a first diode connected in series with the load between the first terminal of the secondary winding and a second terminal thereof,
second means for coupling a first capacitor and a second resistor in a second series circuit between said second terminal of the secondary winding and the control electrode of the switching transistor, a third resistor coupling the control electrode to a supply terminal, and voltage threshold means connected between the control electrode and the first terminal for limiting the voltage on the control electrode, wherein the voltage threshold means comprise a voltage threshold element and a second diode connected in series and with the second diode polarized to conduct when the control voltage of the switching transistor is being limited.

23. The power-supply circuit as claimed in claim 22 wherein the voltage threshold element comprises a zener diode and the series connection of the zener diode and the second diode is in parallel with a current path comprising the control electrode/first main electrode junction of the switching transistor and the first resistor connected in series.

24. The power-supply circuit as claimed in claim 22 further comprising:

an electronic switch connected in parallel with the second diode, and means for operating the electronic switch in response to a signal determined by a parameter of the load.

25. The power supply circuit as claimed in 22 which is self-oscillating and has a forward interval when the switching transistor is on and a flyback interval when the switching transistor is off, the power supply circuit further comprising:

a second transistor connected in parallel with the second diode and having a control electrode coupled to the second terminal of the secondary winding and to a circuit point that monitors the load voltage, said second transistor being turned on at a given level of the load voltage to short-circuit the second diode during the flyback interval.

26. The power supply circuit as claimed in claim 22 wherein the load is connected in series circuit with the first series circuit between the supply voltage input terminal and a point of reference voltage, said power supply circuit further comprising a further transistor serially connected between the primary winding and the switching transistor and having a control electrode coupled to a circuit point having a voltage stabilized with respect to variations in the supply voltage.

27. The power supply circuit as claimed in claim 26 further comprising a third diode connected in series with an impedance element between the control electrode of the further transistor and the second terminal of the secondary winding.

28. The power supply circuit as claimed in claim 22 further comprising a second capacitor connected in parallel with the second resistor.

29. The power supply circuit as claimed in claim 20 further comprising a further transistor connected in series between the primary winding and the switching transistor and with a control electrode coupled to a circuit point having a voltage stabilized with respect to variations in the supply voltage.

30. The power supply circuit as claimed in claim 22 which is self-oscillating and has a forward interval when the switching transistor is on and a flyback interval when the switching transistor is off, and wherein the load comprises a battery, said first diode being in cut-off during the forward interval and in conduction during the flyback interval whereby current is supplied to charge the battery via the transformer secondary winding and the first diode during said flyback interval.

31. The power supply circuit as claimed in claim 27 wherein the power supply circuit is self-oscillating and has a forward interval when the switching transistor is on and a flyback interval when the switching transistor is off, and a positive feedback voltage is produced across the secondary winding during the forward interval which turns on the third diode and provides drive for the control electrode of the further transistor via the third diode, and during the flyback interval a voltage is developed across the secondary winding of a polarity to cut-off conduction of the third diode.

32. The power supply circuit as claimed in claim 22 further comprising a fourth resistor serially connected between the second series circuit and the control electrode of the switching transistor, and a second voltage threshold element coupled to the control electrode of the switching transistor via the fourth resistor and to a junction point between the first threshold element and the second diode.

33. The power supply circuit as claimed in claim 22 wherein a junction point between the load and the first terminal of the secondary winding is connected to ground.

* * * * *